United States Patent Office.

JULIUS HACKERT, OF NEW YORK, N. Y.

Letters Patent No. 65,563, dated June 11, 1867.

IMPROVED METALLIC COMPOUND OR ALLOY.

*The Schedule referred to in these Letters Patent and making part of the same.*

TO ALL WHOM IT MAY CONCERN:

Be it known that I, JULIUS HACKERT, of 450 Fifth street, New York, in the county and State of New York, have invented a new and useful Improved Metal Compound; and I do hereby declare that the following is a full, clear, and exact description thereof, which will enable those skilled in the art to make and use the same.

This invention refers to a compound of cream of tartar, saltpetre, copper, borax, zinc, and tutty, which, when properly prepared, forms a tough, ductile mass, similar in its appearance to gold, not liable to tarnish by the action of the atmospheric air, and capable of withstanding the influence of weak acids and alkalies.

The ingredients which I use in preparing my compound are mixed together as follows: I take half a pound of cream of tartar, heat it in a suitable vessel to a red heat, and then add one ounce of saltpetre. In another vessel or crucible I melt half a pound of copper, and then I pour the fluid metal into the vessel containing the cream of tartar and saltpetre. To this compound I add the following ingredients: borax, one ounce; metallic zinc, one ounce; tutty, one ounce; and when the mass is thoroughly and evenly mixed, I pour it into moulds of the required shape. The metal compound thus obtained has a reddish yellow color, imparted to it by the mixture of cream of tartar and saltpetre, whereby its appearance is rendered similar to gold; it is very tough and ductile; it can be rolled out into sheets of any desired thickness, and worked into articles of different nature; it does not tarnish by the influence of the atmospheric air, and it is not attacked by weak acids and alkalies. For these reasons it is particularly applicable for spoons and forks, and it can also be used with good advantage for dental purposes, that is to say, for making the bases and plates and other parts of artificial dentures.

What I claim as new, and desire to secure by Letters Patent, is—

A metal compound made of the ingredients herein specified, and mixed together substantially in the manner and about in the proportion set forth.

Also the addition of saltpetre and cream of tartar to a compound of copper and zinc, substantially as and for the purposes described.

JULIUS HACKERT.

Witnesses:
W. HAUFF,
D. B. CHILDS.